(12) United States Patent
Yoshihara et al.

(10) Patent No.: US 6,579,646 B2
(45) Date of Patent: *Jun. 17, 2003

(54) STORAGE BATTERY

(75) Inventors: Yasuyuki Yoshihara, Aichi (JP);
Yoshihiro Murata, Shizuoka (JP);
Takashi Hattori, Aichi (JP); Akira Inanobe, Aichi (JP)

(73) Assignee: Matsushita Electric Industrial Co., Ltd., Osaka (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/181,500

(22) Filed: Oct. 28, 1998

(65) Prior Publication Data

US 2001/0012589 A1 Aug. 9, 2001

(30) Foreign Application Priority Data

Dec. 5, 1997 (JP) ................................. 9-335357

(51) Int. Cl.[7] .................... H01M 4/64; H01M 4/72; H01M 10/34; H01M 10/52; H01M 6/04
(52) U.S. Cl. .................. 429/233; 429/60; 429/204; 429/225; 429/228; 429/241
(58) Field of Search ................. 429/233, 241, 429/60, 207, 225, 228

(56) References Cited

U.S. PATENT DOCUMENTS

| 3,867,200 | A | * | 2/1975 | Daniels, Jr. ................ 29/623.1 |
| 3,891,459 | A | * | 6/1975 | McCartney, Jr. et al. ... 429/233 |
| 3,989,539 | A | * | 11/1976 | Grabb ........................ 429/241 |
| 5,368,961 | A | * | 11/1994 | Juergens .................... 429/233 |
| 5,626,989 | A | * | 5/1997 | Doundoulakis ............. 429/233 |
| 5,958,625 | A | * | 9/1999 | Rao ........................... 429/241 |
| 5,989,749 | A | * | 11/1999 | Kao et al. .................. 429/241 |

* cited by examiner

Primary Examiner—Patrick Ryan
Assistant Examiner—Julian Mercado
(74) Attorney, Agent, or Firm—RatnerPrestia

(57) ABSTRACT

A lead-acid storage battery includes a positive electrode, a negative electrode and an electrolyte material. The foregoing negative electrode has a first grid with a first grid geometry and a first active material provided on the above first grid. The foregoing positive electrode has a second grid with a second grid geometry and a second active material provided on the above second grid. A first mesh area of the foregoing first grid is smaller than a second mesh area of the foregoing second grid, thereby achieving an excellent high rate discharge cycle life.

10 Claims, 3 Drawing Sheets

Mesh Area of Negative Electrode's Grid Structure/ Mesh Area of Positive Electrode's Grid Structure(%)

STORAGE BATTERY

FIELD OF THE INVENTION

The present invention relates to storage battery and relates, in particular, to a lead-acid storage battery for electric cars and the like that require particularly high output characteristics.

BACKGROUND OF THE INVENTION

Prior art lead-acid storage batteries for electric vehicles have so far been used in electric golf carts, lawn mowers and the like that require an average current of (1/5) CA(5 hour rate current) and 1 CA or so even at the maximum. The discharge capacity of the foregoing batteries is limited by the characteristics of positive electrodes. In order to increase the discharge capacity of the positive electrodes (i.e., the utilization factor of active material), such efforts have been made as designing a grid that shows excellent current collecting characteristics, increasing the amount of active material used in positive electrodes and the like. On the other hand, in order to achieve a high degree of the battery's weight efficiency, efforts have been made in designing lead-acid storage batteries to reduce the weight of the negative electrode as much as possible by such measures as reducing the usage amount of active material and increasing the mesh area of the grid.

In recent years, however, as the development of electric cars having a driving performance (acceleration and gradability) comparable to that of gasoline-driven cars is pursued actively, far more stringent high rate discharge characteristics are required of lead-acid storage batteries for electric cars than those for electric vehicles.

Although the low rate discharge capacity does not show much reduction during the lapse of charge/discharge cycles, the high rate discharge capacity is quickly degraded, thereby failing to meet the acceleration requirement and ending up with a shorter life than expected.

Therefore, it is important for a lead-acid storage battery intended for a cyclic operation with high rate discharge as encountered in electric cars and the like to prevent the degradation of high rate discharge capacity (i.e., enhanced life) during the lapse of charge/discharge cycles.

The foregoing degradation of high rate discharge capacity is mostly attributable to the degradation in negative electrode capacity. In order to prevent the above, such methods as reducing current density by the increased number of electrodes that is made possible through developing thinner electrodes, increasing the amount of active material used in negative electrodes and the like have been studied.

However, the prior art structure as described in the above causes lead sulfate to be accumulated in the active material of negative electrodes during the lapse of charge/discharge cycles, thereby creating a problem of reducing discharge capacity.

In addition, the increased amount of active material and increased number of electrodes have resulted in a drawback of reducing the battery's weight efficiency.

SUMMARY OF THE INVENTION

A storage battery of the present invention includes a positive electrode, a negative electrode and an electrolyte material, in which the negative electrode has a first grid with a first grid configuration and a first active material provided on the foregoing first grid;

the positive electrode has a second grid with a second grid configuration and a second active material provided on the foregoing second grid; and a first mesh area of the first grid is smaller than a second mesh area of the second grid.

Particularly desirable is that the first mesh area is about 50% or less of the second mesh area.

Further, particularly desirable is that the foregoing first and second grids are an expanded grid, respectively.

Accordingly, with the negative electrode, the contact area between the first active material and the first grid increases and further the average distance between the first active material and the first grid is reduced, thereby making the reaction of the negative electrode uniform and also improving the reaction of the negative electrode.

Furthermore, as a result of making the mesh area of positive electrode's grid larger than the mesh area of negative electrode's grid, the magnitude of battery's capacity is governed by the positive electrode, thus allowing the utilization factor of negative electrode to be kept low in comparison with the negative electrode's possible storage capacity.

In addition, the charge acceptability of negative electrode can also be enhanced. As a result, the prevention of an accumulation of lead sulfate is made possible, thereby improving high rate discharge cycle life.

DETAILED DESCRIPTION OF THE PRESENT INVENTION

Next, an explanation will be made on storage batteries in exemplary embodiments of the present invention.

Figure 3:
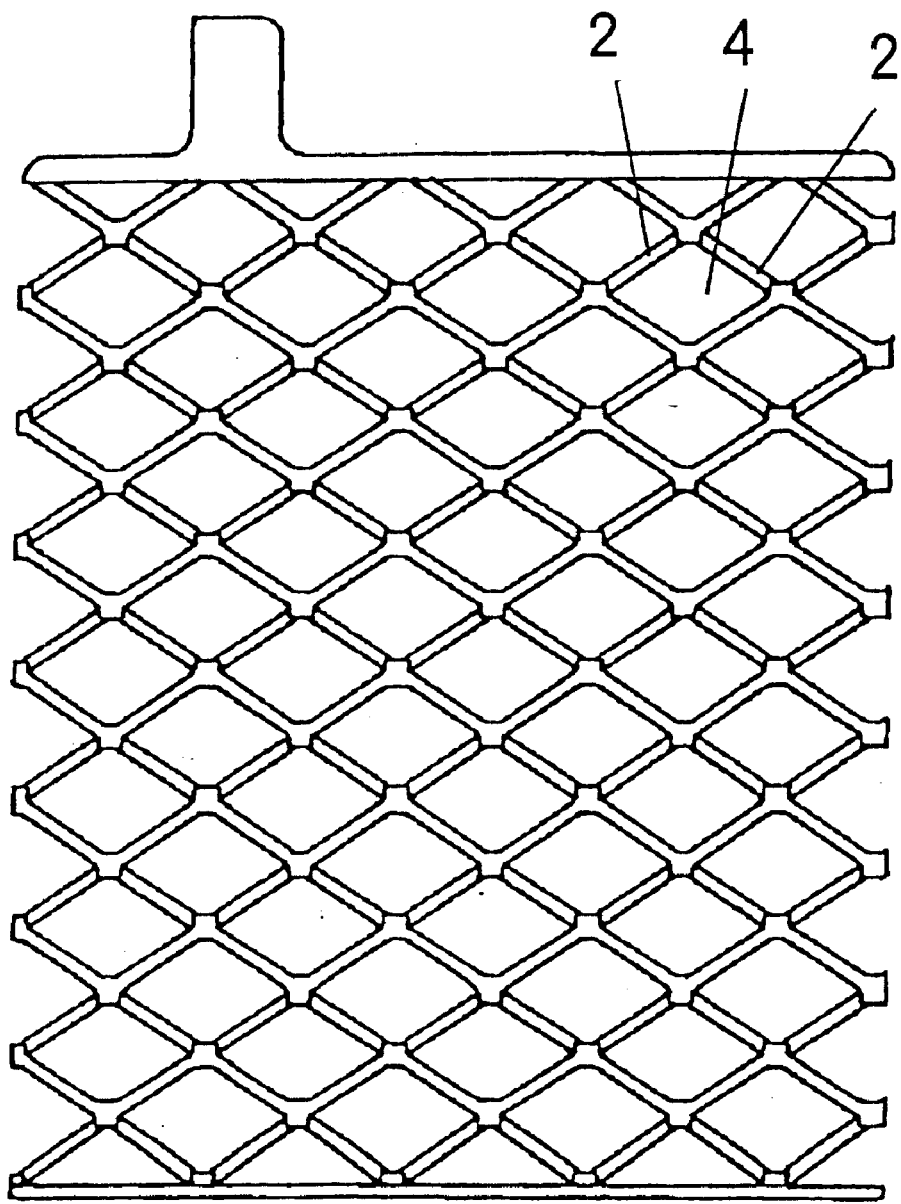
FIG. 3 is a front view to show the geometry of a grid for use with a storage battery in an exemplary embodiment of the present invention.

Electrodes are produced as described in the following:

A belt-shaped sheet material prepared by rolling a lead alloy is slitted for an expanded grid and then expanded to form meshes, thus producing a grid with a geometry as shown in FIG. 3. In FIG. 3, a grid 10 has a plurality of segments 4 with each segment surrounded by strand 2. The area of each respective segment 4 surrounded by strand 4 in the plurality of segments 4 is defined as a mesh area.

As the grids used for tests, two kinds of grids are prepared, one being the same as a prior art grid (with a mesh area of about 150 $mm^2$) and the other being a grid of a smaller mesh area (about 50 $mm^2$) than the mesh area of the prior art grid.

A paste-like active material is prepared by kneading a mixture of powder that is formed mainly of lead oxide, water and sulfuric acid. The paste of active material thus prepared is applied to the foregoing grids so that the amount of active material applied to each respective grid is made equal with one another, and then aged and dried, thus producing a variety of positive and negative electrodes.

By the use of these positive and negative electrodes, various lead-acid storage batteries have been produced. Sulfuric acid is used as electrolyte in these batteries.

Actually, an electrode group has been produced by putting together the electrodes as described in the above and then 4 kinds of batteries, each having a rating of 12 V-60 Ah, have been completed. The mesh area of each respective grid used in the experimental batteries of 4 kinds is shown in Table 1.

TABLE 1

| Battery Identification | Positive Electrode Mesh Area (mm$^2$) | Negative Electrode Mesh Area (mm$^2$) |
| --- | --- | --- |
| A (Prior Art Battery) | 150 | 150 |
| B | 150 | 50 |
| C | 50 | 150 |
| D | 50 | 50 |

The following tests on high rate discharge cycle life characteristics have been performed with the lead-acid storage batteries and prior art storage batteries constructed as described in the above. The experimental batteries are discharged to reach 8.4 V at a constant current of 2.5 CA and then charged by means of a two step constant current charging method, and this whole process is defined as one cycle.

Figure 1:
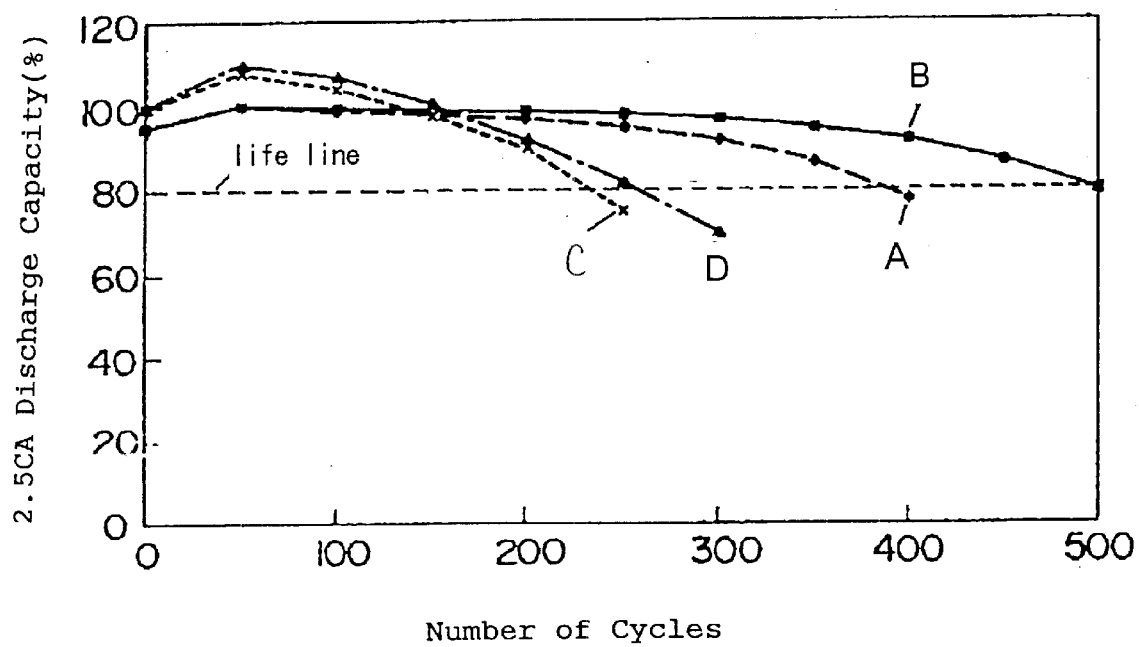
FIG. 1 is a graph to show 2.5 CA high rate discharge cycle life characteristics of a prior art storage battery and also storage batteries in exemplary embodiments of the present invention.

The two step constant current charging method is defined as a method of charging a battery to reach 14.4 V at a first step charge current (0.2 CA) and then charging the battery for 4 hours at a second step charge current (0.05CA). As indicated in FIG. 1, the battery (B) has a longer life than the rest of batteries (A, C and D).

In other words, the battery identified by "B", which has a smaller mesh area for the negative electrode's grid than the mesh area for the positive electrode's grid, shows excellent life characteristics.

The smaller mesh area in grid for the negative electrode than the mesh area of the positive electrode allows (1) the utilization factor of negative electrode to be kept low in comparison with the electrode's possible storage capacity, and (2) the charge acceptability of negative electrode to be enhanced.

Because of the reasons as above, it has been made possible that an accumulation and a deposition of lead sulfate are prevented, resulting in enhanced high rate discharge cycle life.

On the other hand, the battery having a small mesh area in both negative electrode's and positive electrode's grids (Battery Identification D) has shown a shorter cycle life, which may be attributed to an accelerated decrease in cycle life due to a large capacity achieved in the beginning and a large active material utilization factor in both the positive and negative electrodes.

As a result of the above, it can be said that a lead-acid storage battery is improved in high rate discharge cycle life by making the mesh area of the negative electrode's grid smaller than the mesh area of positive electrode's grid.

Next, in order to find out the optimum ratio in mesh area between a negative electrode's grid and a positive electrode's grid, grids for a negative electrode with various mesh areas are prepared and then batteries are produced by using grid sizes for the negative electrode as shown in Table 2.

Three batteries for each respective mesh area have been produced. The rating of all of these batteries is 12 V-60 Ah. These batteries are subjected to a 2.5 CA high rate discharge cycle life test.

TABLE 2

| Battery Identification | Mesh Area of Positive Electrode's Grid Structure (mm$^2$) | Mesh Area Ratio of Negative Electrode's Grid (%) |
| --- | --- | --- |
| E | 50 | 100 |
| F | 50 | 80 |
| G | 50 | 60 |
| H | 50 | 40 |
| I | 50 | 20 |

Figure 2:
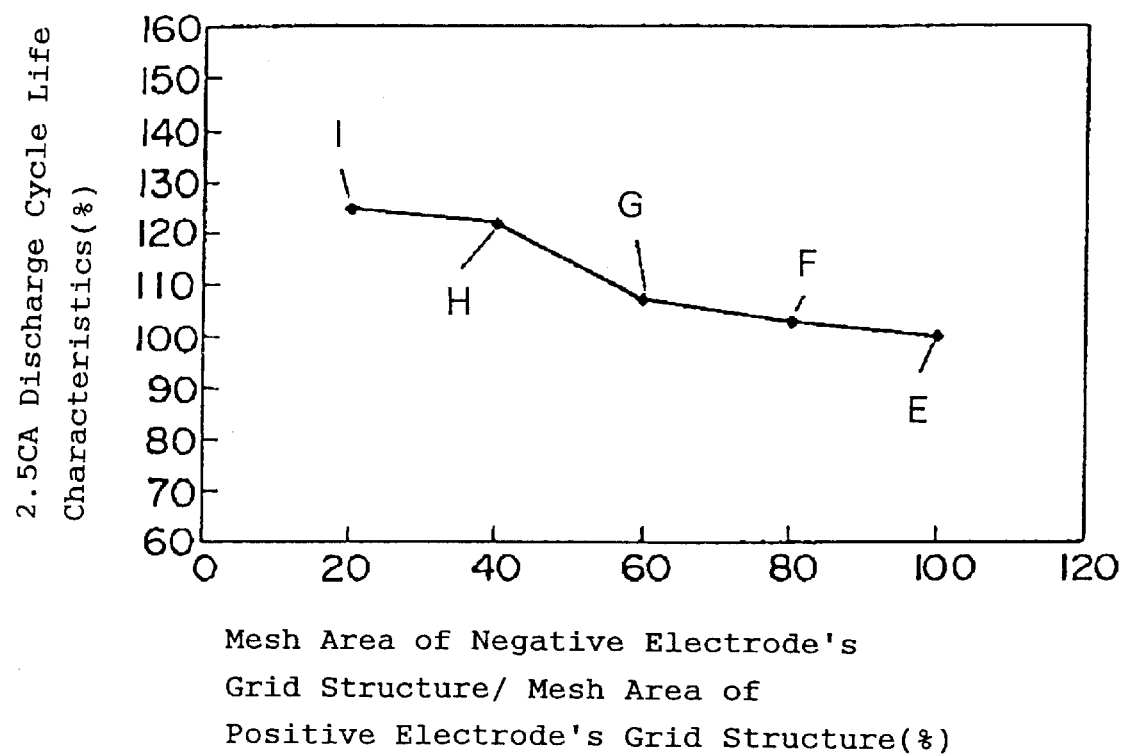
FIG. 2 is a graph to show the relationship between a ratio of [(Negative electrode mesh area)/(Positive electrode mesh area)] and 2.5 CA high rate discharge cycle life of a storage battery in an exemplary embodiment of the present invention.

FIG. 2 is a graph to show the relationship between the mesh area ratio [(Mesh area of negative electrode's grid)/(Mesh area of positive electrode's grid)] and the 2.5 CA high rate discharge cycle life, an average value of which is taken from 3 batteries of each respective mesh area of negative electrode's grid.

As indicated in FIG. 2, when the mesh area of the negative electrode's grid is smaller than the mesh area of positive electrode's grid (like the batteries H and I), a long cycle life can be realized.

In particular, the battery (I) with the mesh area of the negative electrode's grid made smaller than the mesh area of positive electrode's grid by about 50% or more shows particularly excellent life characteristics.

Although the grids in the present exemplary embodiment are produced according to a reciprocating expansion method, a rotary expansion method can also be used to produce grids that are equally usable. In the case of the rotary expansion method, a belt-shaped sheet is slitted with the use of a die formed of multiple circular cutters and then spread to a specified width at a separate step of processing, thus finishing the production of a grid.

The grid produced according to the rotary expansion method also allows the same effect as described in the above to be achieved.

Furthermore, batteries using a prior art grid produced by a casting method are also usable although the effectiveness of these batteries is a little reduced when compared with the batteries that use electrodes of the expanded grid. Thus, the grid used in the batteries of the present invention is not governed by the method employed in producing the grid.

In addition, the storage battery of the present invention is not limited by the types of lead-acid storage battery such as vent type, sheet type and the like. What is disclosed by the present invention shows a particularly excellent effect with a sealing type lead-acid storage battery that has an oxygen cycle to have oxygen gas, which has been produced in the positive electrode at the time of charging, absorbed in the negative electrode and changed into lead sulfate.

According to the present invention as clarified in the above description, a battery provided with a negative electrode's grid of a larger mesh area than the mesh area of a positive electrode's grid shows an excellent high rate discharge cycle life.

What is claimed is:
1. A storage battery comprising:
   a positive electrode, a negative electrode and an electrolyte material, wherein
      said negative electrode has a first grid with a first grid geometry and a first active material provided on said first grid; said first grid is comprised of a plurality of meshes of substantially uniform size including meshes at edges of said first grid, the plurality of meshes defining a first grid mesh area;

said positive electrode has a second grid with a second grid geometry and a second active material provided on said second grid;

said second grid is comprised of a plurality of meshes of substantially uniform size including meshes at edges of said second grid, the plurality of meshes defining a second grid mesh area; and wherein a mesh grid ratio defined by the first mesh area relative to the second grid mesh area, being substantially equal to 0.5 or less.

2. The storage battery according to claim 1, wherein said first grid and said second grid are an expanded grid, respectively.

3. The storage battery according to claim 1, wherein said first grid and said second grid are an expanded grid formed by processing a belt-shaped sheet, respectively.

4. The storage battery according to claim 1, wherein said first grid has a plurality of first meshes; and each respective mesh of said plurality of first meshes has a first area that is the same throughout said plurality of first meshes, and said second grid has a plurality of second meshes; and each respective mesh of said plurality of second meshes has a second area that is the same throughout said plurality of second meshes.

5. The storage battery according to claim 1, wherein said first mesh area of said grid is about 50 mm$^2$ or less.

6. The storage battery according to claim 1, wherein said first and second grids are formed of at least one material selected from the group consisting of lead and lead alloys.

7. The storage battery according to claim 1, wherein said first and second grids are formed of at least one material selected from lead and lead alloys, said first and second active materials include lead oxide and said electrolyte material includes sulfuric acid.

8. The storage battery of claim 1 wherein said first grid additionally comprises a third plurality of mesh apertures in a plurality of adjacent columns, said third plurality of mesh apertures occupying substantially equal areas.

9. The storage battery of claim 1 wherein said first plurality of mesh apertures included in said first grid are diamond-shaped.

10. A storage battery comprising:

an electrolyte material;

a negative electrode that has a first expanded grid formed of at least one material selected from the group consisting of lead and lead alloys and a first active material that includes lead oxide, said first expanded grid comprising a plurality of meshes of substantially uniform size including meshes at edges of said first grid; and a positive electrode that has a second expanded grid formed of at least one material selected from the group consisting of lead and lead alloys and a second active material that includes lead oxide, said second expanded grid comprising a plurality of meshes of substantially uniform size including meshes at edges of said second grid, wherein a mesh grid ratio is defined by the plurality of meshes of the first expanded grid relative to the plurality of meshes of the second expanded grid and the mesh grind ratio is substantially equal to 5 or less.

* * * * *

UNITED STATES PATENT AND TRADEMARK OFFICE
CERTIFICATE OF CORRECTION

PATENT NO. : 6,579,646 B2
DATED : June 17, 2003
INVENTOR(S) : Yoshihara et al.

It is certified that error appears in the above-identified patent and that said Letters Patent is hereby corrected as shown below:

<u>Column 4, line 63 through Column 5, line 14,</u>
Please replace claim 1 with the following:

-- A storage battery comprising:

a positive electrode, a negative electrode and an electrolyte material, wherein said negative electrode has a first grid with a first grid geometry and a first active material provided on said first grid;

said first grid is comprised of a first plurality of mesh apertures in a plurality of adjacent rows, said adjacent rows extending from a first edge of said first grid to a second edge of said first grid, each of said first plurality of mesh apertures in said plurality of adjacent rows occupying substantially equal areas, the first plurality of mesh apertures each defining a first mesh area;

said positive electrode has a second grid with a second grid geometry and a second active material provided on said second grid;

said second grid is comprised of a second plurality of mesh apertures occupying substantially equal areas, the second plurality of mesh apertures each defining a second mesh area; and
wherein a mesh ratio defined by the first mesh area relative to the second mesh area, being substantially equal to .5 or less during discharge. --

<u>Column 6,</u>
Lines 13-30, replace claim 10 with the following:

-- A storage battery comprising:

an electrolyte material;

a negative electrode that has a first expanded grid formed of at least one material selected from the group consisting of lead and lead alloys and a first active material that includes lead oxide, said first expanded grid comprising a first plurality of mesh apertures in a plurality of adjacent rows, said adjacent rows extending from a first edge of said first expanded grid to a second edge of said first expanded grid, each of said first plurality of mesh apertures in said plurality of adjacent rows occupying substantially equal areas; and

UNITED STATES PATENT AND TRADEMARK OFFICE
CERTIFICATE OF CORRECTION

PATENT NO. : 6,579,646 B2
DATED : June 17, 2003
INVENTOR(S) : Yoshihara et al.

It is certified that error appears in the above-identified patent and that said Letters Patent is hereby corrected as shown below:

<u>Column 6, cont'd.,</u>
a positive electrode that has a second expanded grid formed of at least one material selected from the group consisting of lead and lead alloys and a second active material that includes lead oxide, said second expanded grid comprising a second plurality of mesh apertures occupying substantially equal areas, wherein a mesh grid ratio is defined by the first plurality of mesh apertures of the first expanded grid relative to the second plurality of mesh apertures of the second expanded grid and the mesh grid ratio is substantially equal to .5 or less during discharge. --

Signed and Sealed this

Fourteenth Day of December, 2004

JON W. DUDAS
*Director of the United States Patent and Trademark Office*